United States Patent Office 3,123,603
Patented Mar. 3, 1964

---

3,123,603
PRODUCT OF DIURETIC ACTIVITY AND PROCESS TO PREPARE SAME
Zoltán Földi, Dorottya Heidt, neé Lányi, and Rezsö König, all of Budapest, Hungary, assignors to Chinoin Gyogyszer-es Vegyeszeti Termekek Gyara RT., Budapest, Hungary, a firm
No Drawing. Filed June 28, 1960, Ser. No. 39,405
Claims priority, application Hungary Oct. 1, 1959
3 Claims. (Cl. 260—243)

We have found that a new compound the elementary analysis of which corresponds to formula $C_{10}H_{14}N_5ClS_2O_4$ and which is a derivative both of 5-chloro-2,4-disulphamyl-aniline and of 6-chloro-7-sulphamyl-benzo-dihydro-1,2,4-thiadiazine-1,1-dioxide as well is a very effective diuretic. This compound melts at about 227–230° C. with decomposition (yellowish foam) and exhibits an intense red colouration with resorcinol wetted by concentrated sulphuric acid. Since this compound can be prepared by the action of hexamethylene-tetramine either on 5-chloro-2,4-disulphamyl-aniline ($C_6H_8N_3ClS_2O_4$) or on 6-chloro-7-sulphamyl-benzo-dihydro-1,2,4-thiadiazine-1,1-dioxide ($C_7H_8N_3ClS_2O_4$), the excess of atoms ($C_3H_6N_2$) related to the latter formula, probably has the following structure:

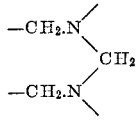

which corresponds to half a molecule of hexamethylenetetramine. The formula $C_{10}H_{14}N_5ClS_2O_4$ is in agreement, among others, with the structural formula which depicts an N,N-diazocyclopentamethylene-N,N-methylene-derivative, the bonding sites of the diazocyclopentamethylene and of the methylene groups being unsettled. Thus, the precise structure of the compound is yet not cleared; this is, however, relating to the pharmacological activity of this compound of no relevance.

The new compound may be used as medicament in the form of pharmaceutical preparations, for example, as tablets, dragees or capsules, suspensions, emulsions; these preparations may also contain, in combination, other therapeutically useful substances, such as hypotensive agents.

The new compound of empirical formula $$C_{10}H_{14}N_5ClS_2O_4$$

can be obtained by the action of hexamethylenetetramine on 2,4-disulphamyl-5-chloroaniline or on 6-chloro-7-sulphamyl-benzo-dihydro-1,2,4-thiadiazine-dioxide. Preferably, 2,4-disulphamyl-5-chloro-aniline is subjected to the action of hexamethylenetetramine. This action can take place by heating the reactants in a medium containing water, preferably consisting of water. One can use organic solvents, as well, preferably in the presence of water.

When 6-chloro-7-sulphamyl-benzo-dihydro-1,2,4-thiadiazine-1,1-dioxide is subjected to the action of hexamethylenetetramine, the same media, as mentioned above, further concentrated ammonia, preferably at room temperature, can be used.

Further details are to be found in the examples.

Examples (1) 28.5 g. (0.1 mole) of 2,4-disulphamyl-5-chloroaniline, 14 g. (0.1 mole) of hexamethylenetetramine and 125 ml. of water are refluxed for 3 hours, while stirring. The reaction mixture remains a suspension. Ammonia is evolved. Next day, the bright crystals are brought on a suction filter, washed with water (2 x 25 ml.), then dried over phosphoric anhydride at room temperature to yield 35 g. of the product (M.P. at about 227° C., with effervescence).

The elementary analysis of the compound (C=32.60%; H=3.55%; N=18.72%) suggests formula $$C_{10}H_{14}N_5ClS_2O_4$$

From the five N-atoms two can be easily found by the following titration: 181 mg. of the product are titrated with 20 ml. of 0.1 n-HCl for half an hour on the steam-bath. The resulting solution is cooled, 2.5 ml. of ethanol added and titrated with 0.1 n-NaOH (indicator methyl red). 10 ml. of 0.1 n-NaOH are consumed, corresponding to 7.74% N (calculated for 2 N-atoms: 7.65% N).

Some milligrams of the product when placed on a mixture of resorcinol and conc. sulphuric acid exhibit an intense red colour reaction. The product is slightly soluble in dilute hydrochloric acid, readily soluble in 2 molecules of cold 0.1 n-NaOH, hardly soluble in organic solvents. One g. of the product dissolved in boiling water (33 ml.) deposits on cooling crystals (0.74 g.) of 6-chloro-7-sulphamyl-benzo-dihydro-1,2,4-thiadiazine-1,1-dioxide.

The product exhibits pronounced diuretic (natriuretic) and antihypertensive activities. The enhanced excretion of urine and the enhanced amount of chloride-ion in the excreted urine can be easily observed on white rats even in peroral doses of 0.2 mg. per kg. body-weight.

(2) In following the procedure as given in Example 1, but using 0.2 mole (i.e. 28 g.) of hexamethylenetetramine instead of 0.1 mole, one obtains 34.8 g. of the product with melting point 227° C. (effervescence). The other properties of the product are, likewise, identical with that of Example 1.

This example reveals that an excess of hexamethylenetetramine (over 1 molecule) does not take part in the reaction.

(3) One proceeds as given in Example 1, but using only 0.05 mole (i.e. 7 g.) of hexamethylenetetramine instead of 0.1 mole. The product weighs 29.2 g. and melts at 226–227° C. (effervescence). The somewhat low N-content (17.9%) indicates, however, a small contamination with the starting disulphamyl-3-chloro-aniline.

(4) 29.7 g. (0.1 mole) of 6-chloro-7-sulphamyl-benzodihydro-1,2,4-thiadiazine-1,1-dioxide, 14 g. (0.1 mole) of hexamethylenetetramine and water (100 ml.) are refluxed for three hours while stirring. The reaction mixture remains a suspension and evolution of ammonia can be observed. After cooling and allowing to stand for some hours, the crystals are isolated, washed with water and dried. One obtains 35.75 g. (97% of the theoretical) of the product as white crystals, showing a melting point of 228° C. (effervescence). Its N content (Kjeldahl) is 18.6%. It is identical with the product of Example 1. With resorcinol and conc. sulphuric acid it exhibits an intense red colour reaction.

(5) 285 mg. of 2,4-disulphamyl-5-chloro-aniline are dissolved in 1.5 ml. of β,β'-di-methoxy-diethylether and a solution of 140 mg. of hexamethylenetetramine in 0.1 ml. of water added. The mixture is kept in an oil-bath of 110° C. for 3 hours. Bright crystals result. After cooling and allowing to stand for 1½ hours, the crystals are brought onto a suction filter, washed with two portions of β,β'-dimethoxy-diethylether (0.2 ml. each), then washed with 0.5 ml. of ether. 355.5 mg. of the product are obtained; M.P. 227° C. with decompensation (yellowish foam). The product is identical with that of Example 1. It exhibits with resorcinol and conc. sulphuric acid a strong cinnober red colouration.

(6) The same starting materials are used as given in the preceding example, but 2 ml. of ethanol and 0.5 ml. of water are used as diluents. The mixture is heated on the steam-bath for 3 hours. In the first half an hour a solution occurs, followed by precipitation of white crystals. Next day, these are collected, washed with three portions of ethanol (0.5 ml. each), then dried. 295 mg. of the product result, melting at 228° C. (yellowish foam). The product is identical with that of Example 1. It exhibits red colour reaction with resorcinol wetted with conc. sulphuric acid.

(7) 594 mg. of 6-chloro-7-sulphamyl-benzo-dihydro-1,2,4-thiadiazine-1,1-dioxide are dissolved in conc. ammonia (2 ml.), and 140 ml. of hexamethylenetetramine added. Soon, crystalisation sets in and the reaction-mixture turns to a white crystal pulp. It is allowed to stand for two hours, preventing escape of ammonia, and more some additional hours in an open vessel in order to reduce the concentration of ammonia. Then, the crystals are filtered on a suction filter, washed with 1 ml. of water and dried over phosphoric acid. Snow white crystals (725 mg.) result, which melt at 230° C. (yellowish foam).

All melting points are uncorrected.

We claim:

1. A process for the preparation of a compound of diuretic activity, the elementary analysis of which corresponds to formula $C_{10}H_{14}N_5ClS_2O_4$ and which is a derivative of 5-chloro-2,4-disulphamyl-aniline, the compound melting at about 227–230° C. with decomposition and exhibiting an intense red colouration with resorcinol wetted by concentrated sulphuric acid, which comprises heating at reflux temperature one molecule of 5-chloro-2,4-disulphamyl-aniline with an amount of 0.5–2 molecules of hexamethylenetetramine in water as reaction medium.

2. A compound of diuretic activity corresponding to the formula $C_{10}H_{14}N_5ClS_2O_4$ melting at about 227–230° C. with decomposition into a yellowish foam, exhibiting an intense red coloration with resorcinol wetted with concentrated sulphuric acid, obtained by refluxing one molecule of 5-chloro-2,4-disulphamyl-aniline with an amount of 0.5-2 molecules of hexamethylenetetramine in water as diluent.

3. A process to prepare a new compound of diuretic activity, corresponding to the formula $C_{10}H_{14}N_5ClS_2O_4$, melting at about 227–230° C. with decomposition into a yellowish foam, exhibiting an intense red coloration with resorcinol wetted with concentrated sulfuric acid, which consists in refluxing for three hours one molecule of 5-chloro-2,4-disulphamyl-aniline with an amount of 0.5–2 molecules of hexamethylenetetramine in water as diluent.

References Cited in the file of this patent

Franklin: Nitrogen System of Compounds, pages 240–241 (1935).

Fieser et al.: Organic Chemistry, pages 215–217 (1950) second ed.

Freeman et al.: J. Org. Chem. vol. 16, pages 818–821 and 833–835 (1951).

De Stevens et al.: Experientia, vol. 14, p. 463 (1958).

Werner et al. 135th ACS Meeting April 5–10 (1959), abstract of papers, March 1959, pages 27N and 28N.

UNITED STATES PATENT OFFICE
CERTIFICATE OF CORRECTION

Patent No. 3,123,603                                        March 3, 1964

Zoltan Földi et al.

It is hereby certified that error appears in the above numbered patent requiring correction and that the said Letters Patent should read as corrected below.

Column 2, line 8, for "titrated" read -- triturated --; column 2, lines 19 to 21, strike out "One g. of the product dissolved in boiling water (33 ml.) deposits on cooling crystals (0.74 g.) of 6-chloro-7-sulphamyl-benzo-dihydro-1,2, -thiadiazine-1,1-dioxide.".

Signed and sealed this 17th day of November 1964.

(SEAL)
Attest:

ERNEST W. SWIDER                                      EDWARD J. BRENNER
Attesting Officer                                           Commissioner of Patents